United States Patent [19]

Hosang et al.

[11] Patent Number: 4,609,212
[45] Date of Patent: Sep. 2, 1986

[54] OIL OR GAS FIELD CASING

[75] Inventors: Armin Hosang, Kaarst; Josef Versch, Neuss, both of Fed. Rep. of Germany

[73] Assignee: Mannesmann Aktiengesellschaft, Duesseldorf, Fed. Rep. of Germany

[21] Appl. No.: 366,977

[22] Filed: Apr. 9, 1982

[30] Foreign Application Priority Data

Apr. 28, 1981 [DE] Fed. Rep. of Germany ....... 3117696

[51] Int. Cl.4 .............................................. F16L 15/00
[52] U.S. Cl. ................................................... 285/334
[58] Field of Search ................................ 285/334, 333

[56] References Cited

U.S. PATENT DOCUMENTS

| | | | |
|---|---|---|---|
| 2,885,225 | 5/1959 | Rollins | 285/334 X |
| 3,355,192 | 11/1967 | Kloesel, Jr. et al. | 285/334 X |
| 3,388,752 | 6/1968 | Hanes et al. | 285/334 X |
| 3,586,353 | 6/1971 | Lorenz | 285/334 |
| 4,004,832 | 1/1977 | Connelly | 285/333 |
| 4,384,737 | 5/1983 | Reusser | 285/334 |

*Primary Examiner*—Thomas F. Callaghan
*Attorney, Agent, or Firm*—Ralf H. Siegemund

[57] ABSTRACT

The made thread end of an oil or gas field casing is tapered at a range of from 1:8 to 1:6.5 and a thread pitch of 3.2 to 2 threads per inch, these dimensions being applied to a pipe larger than 400 mm diameter and a wall thickness of up to 32 mm.

4 Claims, 2 Drawing Figures

OIL OR GAS FIELD CASING

BACKGROUND OF THE INVENTION

The present invention relates to large diameter casings for the oil and gas industry having one or multiple thread on a conical end the number of threads per inch pipe or tube length determining the thread as a whole.

Tubes, pipes and casings in the oil and gas industry are usually constructed with a conical end (pin member) which is threaded so that pin and box ends of two such tubes, casing or pipes can be interconnected directly or pin member (male ends) of two such tubes, casings or pipes can be interconnected by a threaded sleeve. The API standards for such casings require that the number of threads and the tapering of the end cone be uniform over the entire range of interest. This has the advantage of a rather economic cutting tool inventory for making such threads. However, this requirement is definitely a disadvantage when taking the use of such a pipe or casing into consideration; the dimensions of the thread are determined by the smallest diameter and the matching wall thickness. The smallest diameter usually being 4½ inches. In practice, however, particularly when used in a drilling derrick, pipes or casings having such small thread dimensions require extremely exact and sensitive handling. These requirements and precautions are actually inordinately extensive in view of the large pipe diameter and the very large weight of the casing so handled, even at diameters of from 300 to 400 millimeters which are not uncommon. It was observed, however, that pipes, having a diameter in excess of 500 millimeters, 5 threads per 1-inch thread length and a thread cone corresponding to a taper of 1 to 12, cannot be threaded together because even a small and imperceptable skew angle between the two pipes to be threaded together prevented proper thread engagement and interthreading. As a consequence, the threaded connection was not capable of taking up the requisite load and was even damaged to some extent.

DESCRIPTION OF THE INVENTION

It is an object of the present invention to provide a new and improved threaded connection for oil field casings or the like concerning particularly the dimensioning so that even for rather rough operating and several whether conditions such as on an off shore drilling island, one still can thread casings and sleeves together without endangering the strength of the connection.

It is a particular object of the present invention to provide a new and improved threaded connection involving oil and gas field casings of large diameter wherein a fixed number of threads per inch are required to be located on a cone.

In accordance with the preferred embodiment of the present invention, it is particularly suggested for pipes of an outer diameter larger than 400 millimeters and a wall thickness about to 32 millimeters to provide a pitch of the thread at 3.5 to two threads per inch, at a taper of the cone in the range from 1:8 to 1:6.5. Preferably the taper of the thread cone is approximately 1:7.5, the preferred range bearing from 1:7.75 to 1:7.25. The cross section contour of the threading is preferably of the sawtooth (buttress) or trapezoidal variety. Moreover, the pipe should end without thickened portions.

It can thus be seen that the invention resides in a combination of features which combines certain aspects such as uniform thread pitch and uniform cone centered with particular dimensions and structural features so that threading together of casings or with connecting sleeves is greatly facilitated. The primary parameters are the outer diameter of the pipe being larger than 400 millimeters, combined with a suitable and matching wall thickness. The wall thickness should be relatively small, in relation to the internal diameter range so that the pipes can be connected either with a sleeve or with a box member. This avoids particularly the need for upsetting the ends of the pipe or any thickening for threading one pipe to another pipe. The smooth end of the pipe in the final and finished state should be combined with a high strength steel.

It can be seen that under these conditions one can cut the desired threads into the pipe end without requiring an abuttment shoulder for purposes of sealing. Moreover, no other feature is necessary in order to facilitate this threading together of a pipe in a sleeve. The rather large thread pitch from 3.5 to two threads per inch permits groove depths which improve the mechanical strip or peel strength as compared with fine threads and that in turn facilitates threading and thread engagement. It was found, moreover, that buttress or trapezoidal thread cross sections are both very suitable.

The tapering of the thread cone and here particularly the range given above facilitates threading further, this advantage is particularly noticable the more one approaches a taper ratio of 1:6.5. Going further and leaving other conditions the same, one would require an increasing wall thickness which by its nature is a disadvantage and that in fact determines the particular limit. As stated it was found that one should use a small range about the ratio of 1:7.5.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, FIG. 1 illustrates the ends of two pin casings 1 and 5, presumed to have an outer diameter of 508 millimeters and a wall thickness over its entire (unthreaded) length of 16.1 millimeters. The ends of each of these casing members are provided with external threading. FIG. 1 particularly shows casing 1 to have threading 2 and casing 5 has a threading 6. The threading 2 is geometrically delineated or enveloped by a cone corresponding to a taper of 1:7.5. This means that the thread flank diameter 3 (FIG. 2) varies i.e. decreases or increases depending upon the direction one considers, by 1 millimeter per 7.5 millimeter tube or pipe length. Therefore, if the total axial thread length is about 120 millimeters, the pipe or casing wall thickness decreases towards the casings end to about half the value of the thread free portion of the pipe. The pitch correspondes to three threads per one inch.

Figure 2:
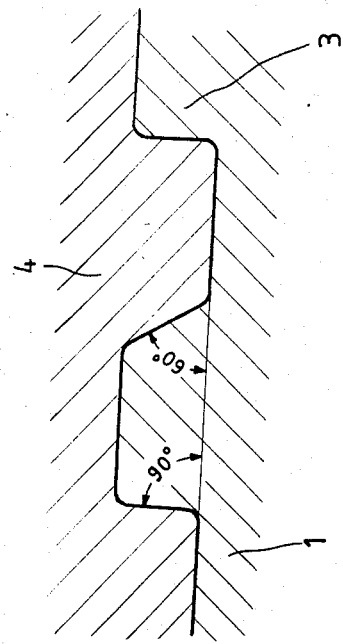
FIG. 2 is an enlarged cross section through the interthreading engagement between one of the casings and the sleeve shown in FIG. 1.

The proportion and shape of the sawtooth or buttress thread to be used in accordance with the invention is shown in FIG. 2. The ratio of pitch high to pipe diameter is 8.467:508 and one can see that a stable but not threadedly matching or engaging position of an 18 meter long casing requires a deflexion from the axis by more than 300 millimeters. This is about the tolerable limit, smaller deviations do not pose any problem. Threads having the usual standard dimension have a critical limit here of about one fourth of the one mentioned above. That latter kind of a deviation is hardly noticable with the naked eye and requires extraordinary skill.

Figure 1:
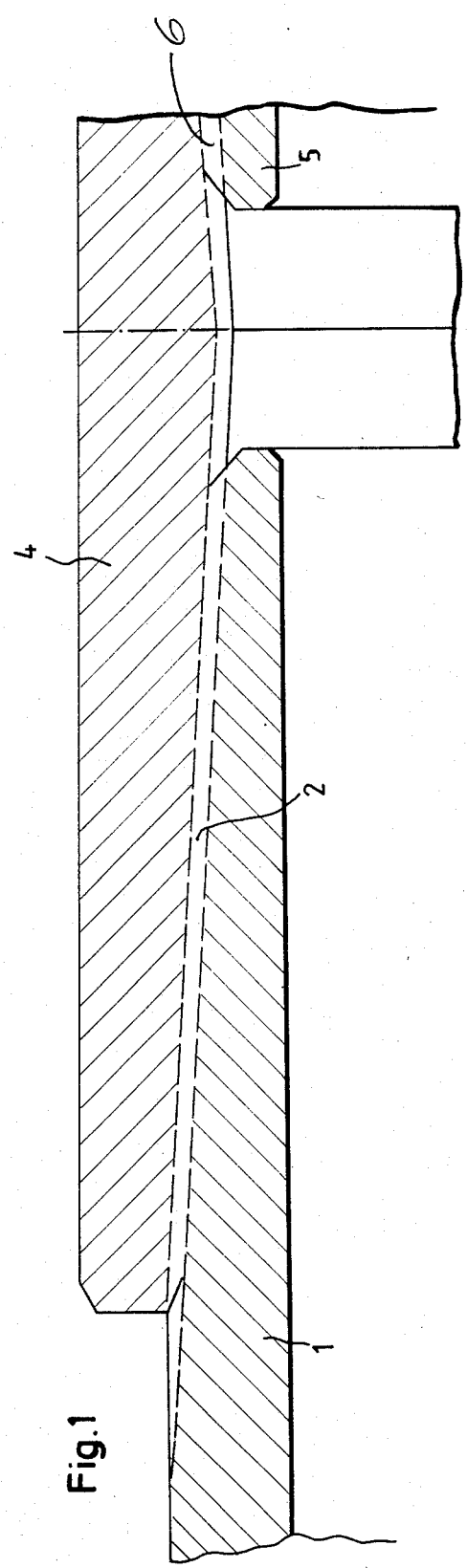
FIG. 1 is a longitudinal section view through the pin ends of two casing member threadedly interconnected by means of sleeve.

FIG. 1 shows the casing pin member 1 as being threaded into a sleeve member 4. The pipe has been screwed on in accordance with a screw moment as specified by the manufacturer and acts exclusively against the resistance of the cronical thread contour. The pipe 1 does not bear against any collar on the sleeve 4 nor will it impinge upon the pipe 5 threaded into the sleeve 4 from the other end. Plural casing members respectively interconnected by sleeves constitutes the pipe string for lining a drill hole. Such a string may run from the surface to a depth of several hundred meters, of course such a casing string includes one or more several still deeper tube strings for further increase of the drilling depth or for the passage of fluid, such as oil or gas.

The invention is not limited to the embodiments described above; but all changes are modifications thereof, not constituting departures from the spirit and scope of the invention, are intended to be included.

We claim:

1. Large diameter casing for the oil and gas field industry with one or more free ending threads, the pipe having a tapered thread end;
   an outer diameter exceeding 400 millimeters;
   and a wall thickness of up to about 32 millimeters; the improvement comprising a thread pitch of 3.5 to two threads per inch and a cone taper in the range of 1 to 7.75 to 1 to 7.25.
2. Casing as in claims 1, the thread having an buttress cross section.
3. Casing as in claim 1, the thread having a trapezoidal cross section.
4. Casing as in claim 1, the pipe ending smoothly without thickening.

* * * * *